United States Patent
Morghen

Patent Number: 6,105,949
Date of Patent: *Aug. 22, 2000

[54] WORKPIECE INDEXING AND CLAMPING SYSTEM

[76] Inventor: Manfred A. Morghen, 6924 Hyde Park Dr., No. 200, San Diego, Calif. 92119

[*] Notice: This patent is subject to a terminal disclaimer.

[21] Appl. No.: 08/807,986

[22] Filed: Mar. 3, 1997

Related U.S. Application Data

[63] Continuation of application No. 08/613,808, Mar. 6, 1996.

[51] Int. Cl.$^7$ ........................................ B23Q 1/00
[52] U.S. Cl. ........................ 269/47; 269/100; 269/303; 269/305; 269/315; 269/900; 269/236
[58] Field of Search .......................... 269/47, 48, 52, 269/63, 66, 99, 100, 101, 134, 137, 138, 142, 145, 165, 166, 203, 204, 216, 217, 225, 227, 229, 231, 235, 236, 303, 305, 900

[56] References Cited

U.S. PATENT DOCUMENTS

| | | | |
|---|---|---|---|
| 724,116 | 3/1903 | Maley | 269/900 |
| 1,016,594 | 2/1912 | Woodman | 269/231 |
| 1,685,899 | 10/1928 | Andrew | 269/235 |
| 5,046,707 | 9/1991 | Allen | 269/309 |
| 5,718,422 | 2/1998 | Morghen | 269/236 |

*Primary Examiner*—Robert C. Watson
*Attorney, Agent, or Firm*—Frank D. Gilliam

[57] ABSTRACT

A workpiece indexing and clamping system for machining the workpiece. Spherical or narrow cylindrical heads of index pins extend from holes in a base plate into workpiece holes to align and index the workpiece. The pin portions in the base plate holes can be expanded to lock them to the base plate. Each pin has relief flats parallel to the pin axis. Clamps engage workpiece edges with thread-like angled grooves on a cam surface to force workpiece edges against the base plate during machining of the workpiece. A central clamp has a pin extending from the base plate into a workpiece hole. Angled grooves in a cam surface are brought into contact with the hole sides to force the workpiece toward the base plate and hold the central area in place during machining.

2 Claims, 3 Drawing Sheets

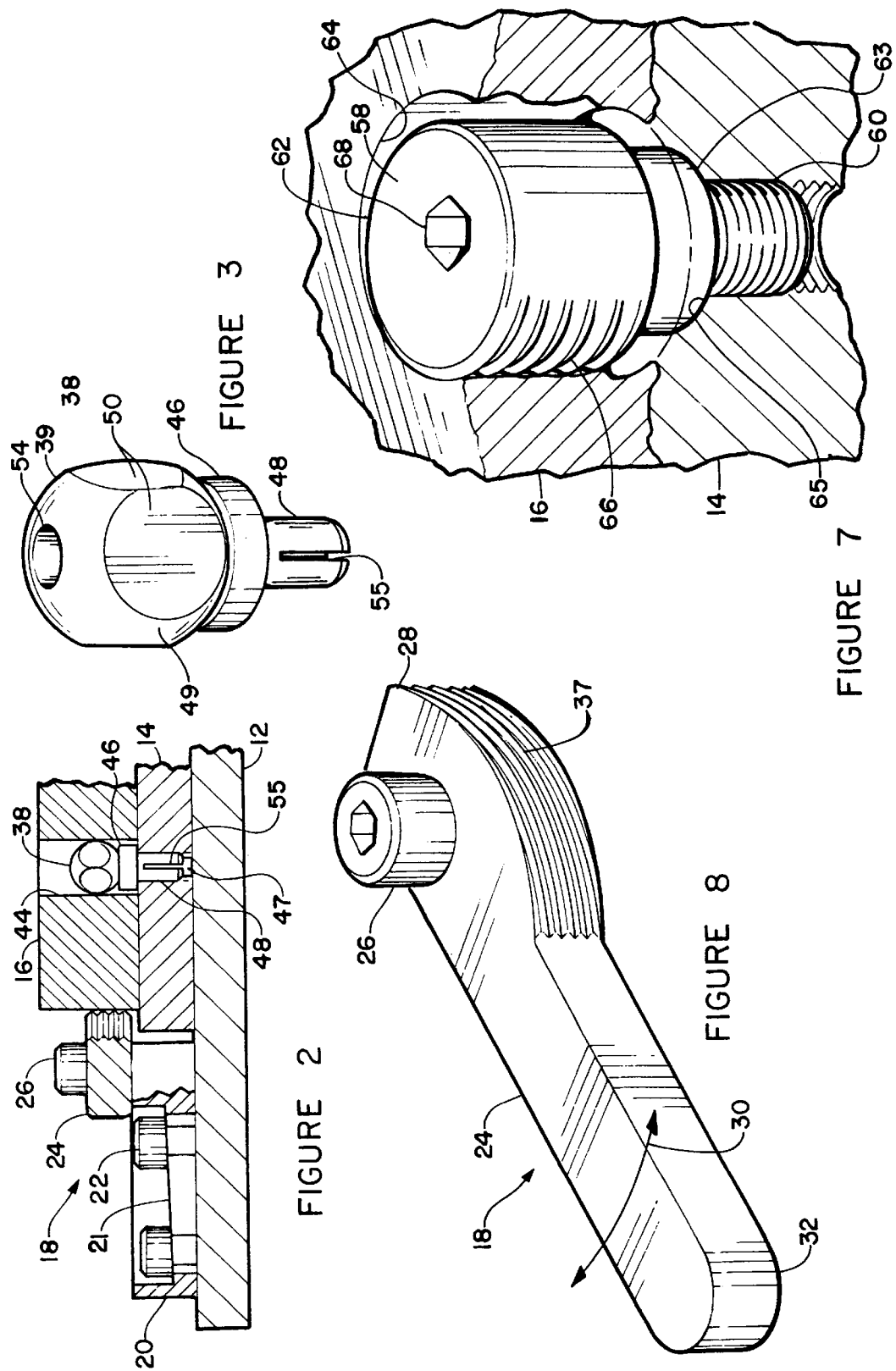

WORKPIECE INDEXING AND CLAMPING SYSTEM

This is a continuation of application Ser. No. 08/613,808 filed on Mar. 6, 1996.

BACKGROUND OF THE INVENTION

This invention relates in general to the clamping of workpieces to a surface and, more specifically, to a system for indexing and clamping a workpiece to a base plate that leaves the opposite surface free for machining or the like.

When raw material or preforms are to be machined it is necessary that the workpiece be tightly clamped to a base plate or an intermediate sub-plate to hold the workpiece stable at a precise position while resisting the forces on the workpiece produced by the machining operation. Typically, such machining includes drilling, boring, honing, grinding and milling.

In numerical controlled machining, a machine tool, such as a milling head, is programmed to follow a very precise path. The workpiece must be located extremely precisely relative to certain machine datum points and/or datum planes from which the machining path is related or measured.

A number of different indexing and clamping systems have been developed to permit a workpiece to be positioned at a specific location on the support plate. Generally, the clamps have fingers and straps or other means that extend over the side of the workpiece opposite the supporting surface. While generally effective, these upper surface clamps must be carefully positioned to avoid interference with the movement of the machine tool, such as a milling head, across the workpiece.

Insufficient clamping pressure, or the use of too few clamps, may allow the workpiece to shift during machining, resulting in wasted, out-of-tolerance products. Further, errors in clamp placement may allow the machine tool cutter to run against the tool, resulting in damaged clamps and serious damage to the machining tool and/or to the machine itself and could be a safety hazard to nearby personnel.

A wide, generally flat workpiece that is clamped to a support plate around the edges may lift slightly at the center due to machining forces. Thus, the central dimensions of the product may be thinner and out-of-tolerance.

It is absolutely essential, especially with numerical controlled machining, that the workpiece be positioned precisely relative to datum points or planes on the support plate. Failure to establish and maintain the precise workpiece position sill result in an improperly machined and rejected part.

A variety of components have been used to accurately locate workpieces. Among these are index pins mounted on or in the support plate and extending into precisely located holes in the workpiece. Round pine inserted into round workpiece holes may have problems such as lack of the necessary concentricity, a hole that has an axis that is slightly off the pin axis (angularly or otherwise), pine that tend to interfere or be loose in productions holes with variable diameters, etc. These problems, and others, largely keep full round index pins from having the necessary overall accuracy and flexibility.

Thus, there is a continuing need for improved indexing and clamping systems for workpieces to be machined, systems that have improved reliability, accuracy and versatility and do not extend over or obstruct the workpiece surface being machined, generally the surface opposite the surface in contact with a support or base plate.

SUMMARY OF THE INVENTION

The above-mentioned problems, and others, are overcome in accordance with this invention by an improved workpiece clamping and locating system for use in machining, in particular numerical control machining. The clamping system basically includes index pins for locating a workpiece on a base plate, and edge clamping arrangement and a central clamping pin. These components cooperate to provide an optimum system, although each could be used independently. The edge clamping portion basically includes a plurality of clamps, each having a simple clamp arm pivotally mounted on a support block that can be fastened to a base plate and preferably is longitudinally movable or adjustable on top of the base plate surface toward and away from a side of a workpiece supported on the base plate. Each clamp arm has a cam surface adjacent to the axis of rotation with the cam surface configured to move towards and away from an adjacent workpiece side as the arm is pivoted. The clamp arm includes means for pivoting the arm about the axis, preferably an extended handle for manual pivoting or a powered gear segment engageable with a powered drive for exact automatic movement toward and against the workpiece.

A workpiece is precisely positioned on a base plate by one or more (if necessary) index pins fastened to the base plate. Each index pin has a generally spherical head with at least two radially spaced flats on the head, the flats lying generally perpendicular to the base plate when the index pin is installed on the base plate. The workpiece is positioned by lowering holes in the workpiece over correspondingly sized index pin heads. The index pins preferably have 2–4 spaced flats. In an optimum embodiment, two pairs of contiguous flats are provided, with the pairs on opposite sides of the head, so that the head has a generally diamond shaped plan view.

As an aid in remotely clamping a workpiece, a central index clamping pin is preferably provided. An eccentric, at least partially threaded, head is secured through a mounting means such as a threaded extension to a base plate. The vertical axis of the partially threaded head is offset from the vertical axis of the mounting means or main body to provide eccentric motion of the head when the clamping pin is rotated. The clamping pin is rotatable through an aperture in the top of the head opposite to the pin mounting means which receives a tool, such as an Allen wrench, screwdriver or the like. When a workpiece hole is placed over the clamping pin (or the clamping pin is inserted through the workpiece into the base plate) and the pin is rotated (counter-clockwise for a right-hand thread) the threads will frictionally engage a side of the hole and force the workpiece tightly sideways and down against the base plate. This arrangement is particularly useful with aide, thin workpieces where, in the absence of central clamping action, a milling tool or the like is likely to cause the workpiece central area to lift and be incorrectly machined and/or cause the workpiece center to vibrate, thus causing negative, unwanted results.

Any suitable base plate may be used with the clamping system of this invention. Where the workpiece is relatively thick, the workpiece may be installed directly onto the surface of a single sheet base plate. Where the workpiece is relatively thin, upper and lower base plates may be used, with a wide lower base plate and a smaller upper baseplate, typically matching the outline of the workpiece and having a surface equal to or slightly larger than that of the workpiece.

Depending on the size of the workpiece, at least two index pins and one or more central clamp pins may be used with the edge clamping system.

BRIEF DESCRIPTION OF THE DRAWING

Details of the invention, and of preferred embodiments thereof, will be further understood upon reference to the drawing, wherein:

FIG. 2 is a section view taken on line 2—2 in FIG. 1;

FIG. 3 is a detail perspective view of one index pin embodiment;

FIG. 7 is a perspective vies, partially cut-away, of one combination central index/clamping pin;

FIG. 8 is a detail perspective view of one edge clamp arm;

DETAILED DESCRIPTION OF PREFERRED EMBODIMENTS

Figure 1:
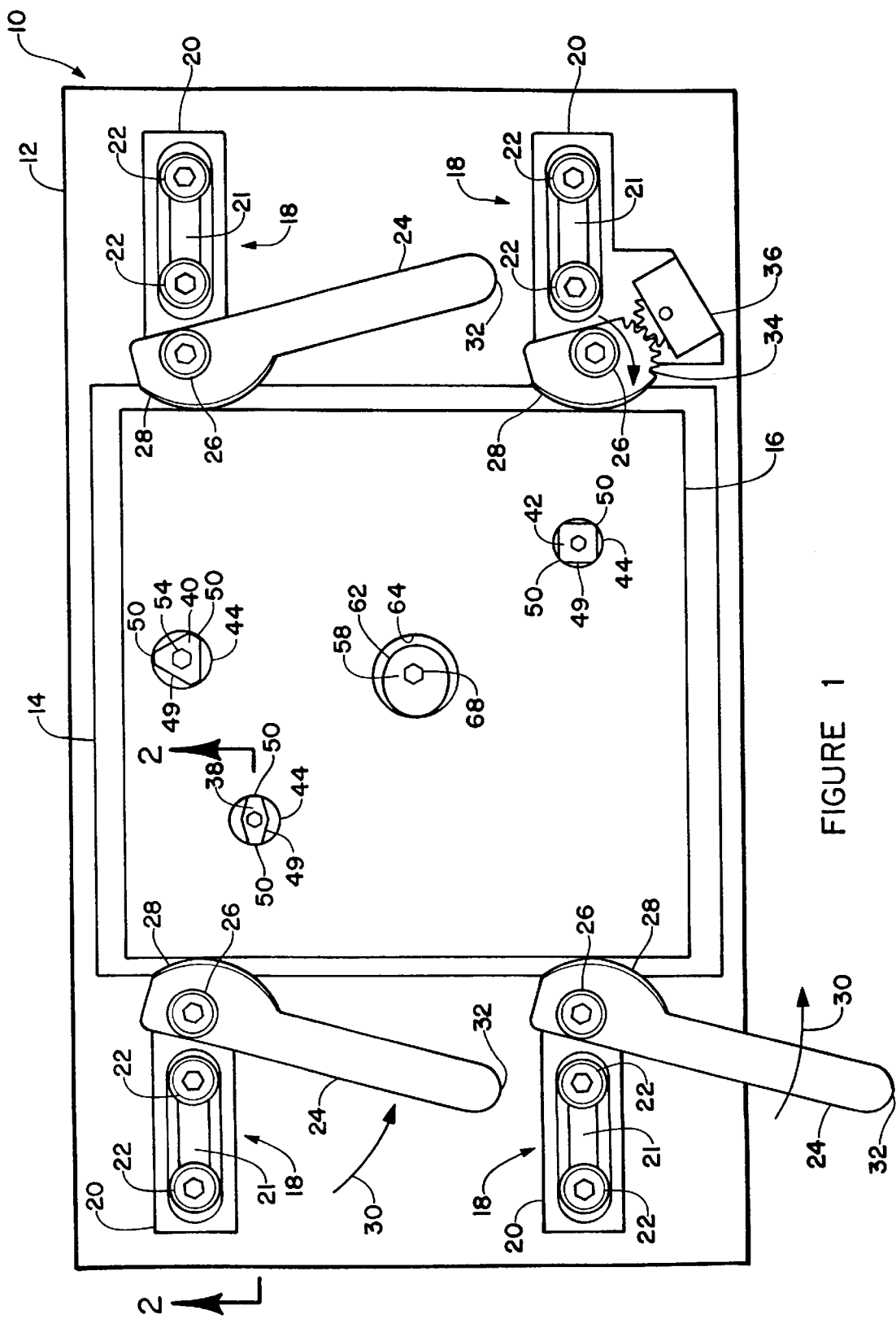
FIG. 1 is a plan view of the clamping system, here including four edge clamps and a central clamp and several kinds of index pins.

Referring to FIG. 1, there is seen a base plate assembly 10 made up of a lower plate 12 and an upper plate 14. A workpiece 16 to be machined is installed on upper plate 14.

Four edge clamp assemblies 18, as seen in FIGS. 1 and 8, are located on opposite sides of workpiece 16. Depending on the size, complexity and particular machining operations to be accomplished, from two to a larger number of clap assemblies 18 may be used in various clamp sizes.

Each clamp assembly 18 includes a support block 20 secured to lower plate 12 by cap screws 22. Cap screws 22 are near the ends of slot 21 in support block. The spaced arrangement provides maximum strength, with some range of adjustment of the position of support block 20 toward and away from workpiece 16. An arm 24 is mounted on each support block 20 by a shoulder screw 26 that permits the arm to pivot about an axis centered on screw 26. Each arm 24 has a cam surface 28 around each axis with a continuous varying diameter. When an arm 24 is moved in the direction indicated by arrow 30, the cam diameter increases, increasing clamping pressure on the edge of workpiece 16. In three of the as 24 shown, an extended handle 32 is provide with which the arm is manually moved between clamped and unclamped positions. The other arm 24, seen to the lower right in FIG. 1, shows an alternate embodiment where, in place of handle 32, a gear segment 34 is provided that engages a gear in a power drive 36, typically a small electrical gear motor, to automatically move the upper portion of arm 24 between clamped and unclamped positions.

Figure 5:
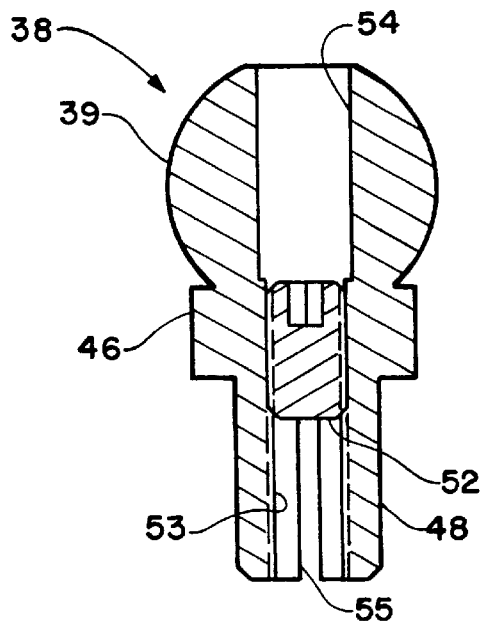
FIG. 5 is a section view taken on line 5—5 in FIG. 4.

As seen in FIGS. 1, 2 and 5, grooves 37 similar to screw threads are provided along cam surface 28. Preferably, the cam surface 28 and power drive surface 34 are suitably hardened or heat treated for strength and durability. Grooves preferably have sharp apexes and are slanted so that as the grooves engage and move along the edge of workpiece 16 the grooves force the workpiece tightly down against upper plate 14, as well as horizontally in two additional directions against opposing index pins, bars and the like and other opposing clamps as shown in FIGS. 1 and 2. Since clamp assemblies 18 do not extend above the upper surface of workpiece 16, machining tools, such as mills, can traverse the entire upper surface without interference from, or impact against, clamps as would be the case with conventional clamping systems.

Generally, workpiece 16 must be precisely located on base plate 10 to align with the machining tools, especially in the case of Numerical Control (N/C) machining. As seen in FIGS. 1 and 3, a novel and more effective index pin system is provided to correctly locate the workpiece.

Three types of ball index pins are shown, a diamond-shaped ball pin 38, a triangular-shaped ball pin 40 and a square-shaped ball pin 42. Each of these pins is secured to upper base plate 14 and slip fits precisely in a hole 44 of suitable diameter, precisely located in the workpiece. Thus, workpiece 16 is exactly located relative to the pins for machining. Each type of ball pin may be used in conjunction with other conventional pins and locators, with particular pin types selected to meet specific conditions and needs.

Figure 4:
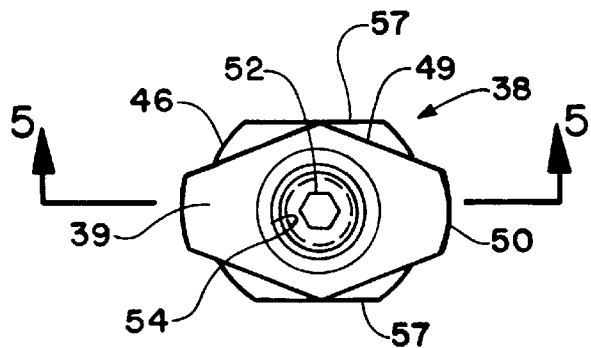
FIG. 4 is a plan view of the pin shown in FIG. 3.
Figure 6:
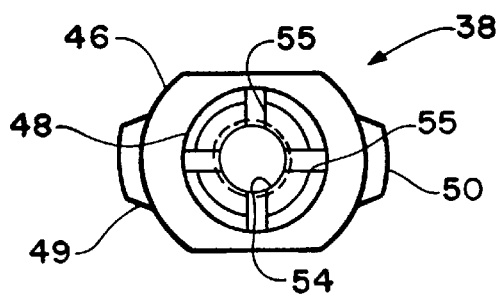
FIG. 6 is a view of the lower end of the pin shown in FIG. 3.

The diamond ball pin 38 embodiment is shown in perspective in FIG. 3 and in orthograpic view in FIGS. 4, 5 and 6. The upper portion 39 of each of the pine 38, 40 and 42 is basically spherical before final machining of flats on the sides. Each pin has a head of different configuration on a base flange 46 and extension 48 for insertion into a correspondingly slip fit hole 47 in upper plate 14. Each pin has the desired number of flats 50 machined into the spherical surface 49 along planes parallel to the vertical axis of the pin, ultimately perpendicular to the surface of upper plate 14. Diamond ball pin 38 has two pairs of contiguous flats 49, arranged on opposite sides of the pin to provide a diamond-like appearance in a plan view. Thus, the two opposed remaining spherical surfaces 50 are the only "tangent line" portions of the pin that contact the interior of a hole 44, providing accurate positioning in two opposed directions, at desired minimum contact, while providing exceptional relief in the remaining directions, thus guaranteeing absolute minimum hole and pin interference. Similarly, triangular pin 40 has three equally spaced flats 49, providing three equally spaced spherical surfaces 50 and square pin 42 has four equally spaced flats 49 and four equally spaced spherical surfaces 50. Pine 40 and 42 are designed to replace existing full size pine for more accurate indexing and alignment with minimum interference. The diamond ball pin configuration is considered optimum, and equally spaced spherical surfaces 50 are preferred for most versatile indexing ability, especially when several planes are involved at complex or compound angles toward each other.

If desired, the surfaces 50 could be rounded to provide essentially a line contact with a workpiece. Further, if desired a different number of flats could be provided, spaced apart other than equally. Clear advantages of pins 38, 40 and 42 include precise yet simple and quick index capability in complex set-ups with additional tolerance benefits. Preferably the ball pins 38, 40 and 42 are suitably hardened or heat treated and otherwise processed for strength, durability and longevity.

For installing and removing pins 38, 40 and 42, an aperture 54 is provided in the upper end to receive a tool, such as a screwdriver, Allen wrench or the like to rotate a setscrew 52 threaded into a narrow lower portion of aperture 54. The interior of aperture 54 bears threads 53, which taper to a narrower lower end of aperture 54. Extension 48 has two or four axial slots 55. Thus, as setscrew 52 is threaded downwardly, extension 48 between slots 55 is forced outwardly to engage the interior wall of hole 47. Since the pin extension 48 is a slip fit in hole 47, an expansion of extension 48 of only 0.001 to 0.003 inch is generally sufficient to hold the pin securely in the hole. The pin is easily removed by simply inserting an Allen wrench into a hexagonal hole in setscrew 52 or a screwdriver into a corresponding slot in the setscrew to move the setscrew back up threads 53.

Two flats 57 are preferably included on opposite sides of flange 46 so that the head can be held in the proper orientation with a conventional wrench while the setscrew is being tightened.

Large, thin, or flat workpieces 16 often tend to lift at central areas during milling. A central clamp 58 as show in FIGS. 1 and 7 is preferably used. Central clamp 58 basically comprises a threaded extension 60 on which a cylindrical, coaxial, base or locator section 63 is secured, with a cylindrical head 62 mounted on the base 63, with the axis of extension 60 and base or locator section 63 offset from the axis of head 62. The offset head 62 is sufficiently eccentric to provide a cam action of the head when rotated about the axis of threaded extension 60 and base 63. Locator section 63 is a close slip fit with hole 65 in plate 14 to assure precise location. Central clamp 58 is threaded into upper plate 14, but not tight against upper plate 14.

Workpiece 16 has a hole 64 that fits over central clamp 58 and is sized so that as the clamp is rotated by means of a conventional Allen wench or the like engaging hexagonal opening 68 in head 62 the cam head 62 moves into engagement with the wall of hole 64 when rotated in one direction and out of engagement when rotated in the opposite direction. In order to provide the clamping action, forcing workpiece 16 against upper plate 14, angled grooves, preferably conventional threads 66, either right-handed or left-handed, as desired, are provided on the outer cam surface of head 62. Thus, when the cam surface is rotated into pressure contact with the wall of hole 64, threads 66 will engage the wall and drive the workpiece 16 against upper plate 14 in the same manner as the grooves 37 on clamp arm 24. Preferably, central clamp pin 58 is suitably hardened, heat treated or otherwise processed for strength, durability and longevity. If desired, a threaded bushing could be used in lower plate 12 rather than directly threading the lower plate opening and a guide bushing could be provided in the opening in upper plate 14 to surround the locator section 63.

A tool receiving opening 68 is provided in the end of head 62 to permit central clamp 58 to be rotated in the manner described by any suitable tool, such as an Allen wrench, screwdriver or the like.

Figure 9:
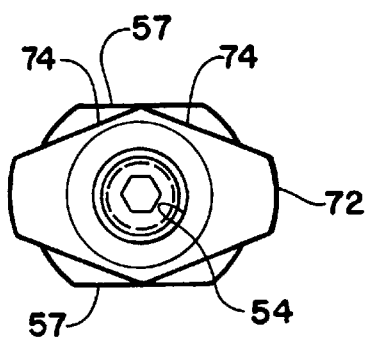
FIG. 9 is an plan view of another locating pin embodiment.
Figure 10:
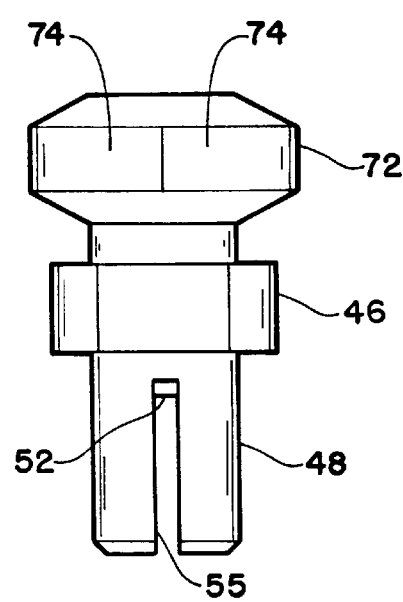
FIG. 10 is a side elevation view of the pin of FIG. 9.

Another embodiment of a locator pin suitable for use with the overall system of this invention is illustrated in FIGS. 9 and 10. In this case, base 46, extension 48, slot(s) 55 and expansion setscrew 52 are the same as discussed above in conjunction with FIGS. 3–6. In this embodiment, however, upper portion 72 is initially machined as a cylinder rather than as a sphere, then is machined to provide a narrow cylindrical band. Finally, two or more flats 74 are machined to provide a diamond shaped, square, triangle, or other desired configuration, as discussed above.

A flange 46 is provided between said upper portion 72 and extension 48 to engage the base plate surface when the pin is in place thereon. Two flats 57 may be provided on opposite sides of flange 46 to be engaged by a conventional wrench while the central setscrew is moved.

This embodiment is particularly suitable where the locating hole 44 in which the pin is inserted is parallel to the pin axis, yet minimum index contact is gauranteed with minimum interference. Where the pin axis and hole may be at an angle to each others, the spherical upper portion embodiments are preferred, since this makes a complex set-up simple and easy to work with, at minimum cost.

While a flat workpiece 16 has been illustrated for convenience of schematic illustration, workpiece could have any suitable shape, including shapes having high peripheral areas (such as an open box-like shape) which are particularly difficult to clamp with prior clamping systems.

While certain specific relationships, materials and other parameters have been detailed in the above description of preferred embodiments, those can be varied, where suitable, with similar results. Other applications, variations and ramifications of the present invention will occur to those skilled in the art upon reading the present disclosure. Those are intended to be included within the scope of this invention as defined in the appended claims.

I claim:

1. A workpiece clamping system which comprises:
   index means for locating a workpiece relative to a base plate said index means comprising:
      at least one index pin having a generally spherical head with at least two flats on said spherical head;
      said index pin secured to said base plate for cooperating with a corresponding opening in a workpiece; and
      means for fastening said head to said base plate with said flats aligned substantially perpendicular to said base plate; and
   at least two clamp assemblies for engaging opposite sides of a workpiece;
   each clamp assembly including:
      a support block;
      a pivot pin extending from said support block;
      an arm mounted on said support block for pivoting movement about said pivot pin;
      said arm having a cam surface with a varying diameter around said pivot pin;
      means for pivoting said arm and cam surface to bring said cam surface into pressure engagement with said workpiece.

2. The workpiece clamping system according to claim 1 wherein said flats comprise two opposed pairs of contiguous flats, whereby said index pin is generally diamond-shaped in plan view.

* * * * *